US010523616B2

(12) United States Patent
Hong et al.

(10) Patent No.: US 10,523,616 B2
(45) Date of Patent: Dec. 31, 2019

(54) LOCATION INFORMATION-BASED INFORMATION SHARING METHOD AND APPARATUS

(71) Applicant: Samsung Electronics Co., Ltd, Gyeonggi-do (KR)

(72) Inventors: Dohy Hong, Seoul (KR);
Myounghwan Lee, Gyeonggi-do (KR);
Seonghee Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 14/752,381

(22) Filed: Jun. 26, 2015

(65) Prior Publication Data
US 2015/0381543 A1    Dec. 31, 2015

(30) Foreign Application Priority Data

Jun. 27, 2014    (KR) ..................... 10-2014-0079533

(51) Int. Cl.
| *H04L 12/58* | (2006.01) |
| *H04L 29/08* | (2006.01) |
| *H04W 4/029* | (2018.01) |
| *G06Q 30/02* | (2012.01) |
| *G06Q 50/00* | (2012.01) |
| *H04W 4/70* | (2018.01) |

(52) U.S. Cl.
CPC ............ *H04L 51/20* (2013.01); *G06Q 30/02* (2013.01); *G06Q 30/0241* (2013.01); *G06Q 50/01* (2013.01); *H04L 51/063* (2013.01); *H04L 67/18* (2013.01); *H04W 4/029* (2018.02); *H04L 51/32* (2013.01); *H04W 4/70* (2018.02)

(58) Field of Classification Search
CPC ....... H04L 51/20; H04L 51/063; H04L 51/32; H04L 67/18; H04W 4/02; H04W 4/005; G06Q 30/02

See application file for complete search history.

(56) References Cited

U.S. PATENT DOCUMENTS

| 8,612,529 B1 | 12/2013 | Mishne et al. | |
| 2003/0126118 A1* | 7/2003 | Burton | .................. G06F 17/301 |
| 2006/0080171 A1* | 4/2006 | Jardins | ................. G06Q 10/087 |
| | | | 705/14.68 |

(Continued)

FOREIGN PATENT DOCUMENTS

| WO | WO 2011851845 A2 | 5/2011 |
| WO | WO 2012122362 A2 | 9/2012 |

*Primary Examiner* — Azizul Choudhury

(57) ABSTRACT

A method and apparatus for sharing messages or contents based on the location information is provided. The method includes receiving a message including content and a location information of the content from at least one sending terminal. The method also includes storing the content and the location information of the content. The method also includes receiving a service request from at least one receiving terminal. The method further includes providing the receiving terminal with content state information based on the location information of the content. The location information of the content includes first location information based on a location of the sending terminal and second location information of a location where the content is posted.

12 Claims, 16 Drawing Sheets

(56) References Cited

U.S. PATENT DOCUMENTS

| | | | |
|---|---|---|---|
| 2008/0132251 A1* | 6/2008 | Altman | G06Q 30/0207 |
| | | | 455/457 |
| 2009/0192887 A1* | 7/2009 | Moore | G06Q 30/02 |
| | | | 705/14.25 |
| 2010/0235432 A1* | 9/2010 | Trojer | H04L 12/2861 |
| | | | 709/203 |
| 2011/0098915 A1 | 4/2011 | Disatnik et al. | |
| 2014/0053212 A1* | 2/2014 | Shoykher | H04N 5/44 |
| | | | 725/59 |
| 2015/0156274 A1* | 6/2015 | Alten | H04L 67/306 |
| | | | 709/204 |

* cited by examiner

LOCATION INFORMATION-BASED INFORMATION SHARING METHOD AND APPARATUS

CROSS-REFERENCE TO RELATED APPLICATION(S) AND CLAIM OF PRIORITY

The present application is related to and claims the benefit under 35 U.S.C. § 119(a) of a Korean patent application filed on Jun. 27, 2014 in the Korean Intellectual Property Office and assigned Serial No. 10-2014-0079533, the entire disclosure of which is hereby incorporated by reference.

TECHNICAL FIELD

The present invention relates to a method and apparatus for sharing information based on location information. In particular, the present invention relates to a method and apparatus for sharing messages or contents based on the location information.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A Social Networking Service is an online-platform to build and reinforce social relations among people through rich opinion exchange, information sharing, and social network extension. Most of the SNSs are web-based and provide means for users to communicate over the Internet such as e-mail and instant messaging.

With the increase of smartphone users and popularization of wireless Internet service, the number of SNS users is increasing rapidly and it is expected that this tendency won't stop for the time being. In respect of making it possible to categorize the service users into groups based on their tendency and manage the groups by means of a database, the potential utilization value of SNS as a marketing tool is rising. This is because the companies can execute customized marketing for the target groups at low cost. Also, the SNS providers are building lucrative revenue models of selling the advertisement space on the SNS pages and social games and items so as to make it possible to expect the continuous growth of the SNS market.

With the proliferation of SNS, various service ideas are conceived around SNS.

Examples of recent SNS-based sites include 'FOURSQUARE™ (location information-based social service)', 'WAZE™ (cloud sourcing real time traffic information)', and 'SNAPCHAT™ (photo sharing service)'. FOURSQUARE™ provides the user with the location information-based information collected with the contents (through a check-in button) about predetermined categories and locations (typically stores). It is not for use of creating any event or story which is not granted to "store" or a predetermined category.

WAZE™ relates to car navigation contexts. It provides real time information on traffic conditions, presence of police, accident locations, etc. based on the data input by drivers. The driver may send a message to notify of an accident or unexpected traffic jam at the wheel.

SNAPCHAT™ uses a photo view idea of a very short time (e.g. 3-10 seconds). Users set a time limit for how long recipients can view their photos, after which they are hidden from the recipient's device and deleted from SNAPCHAT™'s servers. This focuses on the photo sharing.

SUMMARY

It is a primary object to provide an enhanced information sharing method and apparatus that is capable of providing the information based on the location information. Also, the present invention aims to provide a location information-based message and contents sharing method and apparatus that is capable of using extended location metadata.

In a first example, a location-based information provision method of a server is provided. The method includes receiving a message including content and a location information of the content from at least one sending terminal. The method also includes storing the content and the location information of the content. The method further includes receiving a service request from at least one receiving terminal. The method includes providing the receiving terminal with content state information based on the location information of the content. The location information of the content includes first location information based on the location of the sending terminal and second location information of the location where the content is posted.

In a second example, a server for providing location information-based information is provided. The server includes a communication unit configured to communicate with at least one network node. The server also includes a control unit configured to control receiving a message including content and a location information of the content from at least one sending terminal. The control unit is also configured to store the content and the location information of the content. The control unit is further configured to receive a service request from at least one receiving terminal. The control unit is configured to provide the receiving terminal with content state information based on the location information of the content. The location information of the content includes first location information based on the location of the sending terminal and second location information of the location where the content is posted.

In a third example, a location information-based service reception method of a terminal is provided. The method includes transmitting a message including a content and location information of the content. The method also includes receiving content state information generated based on the location information of the content from the server. The location information of the content includes first location information based on the location of the terminal and second location information of a location where the content is posted.

In a fourth example, a terminal to receive a location information-based service is provided. The terminal includes a communication unit configured to communicate with at least one network node. The terminal also includes a control unit configured to control the communication unit to transmit a message including content and location information of the content and receive content state information generated based on the location information of the content from the server. The location information of the content includes first location information based on the location of the terminal and second location information of a location where the content is posted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention. This aims to omit unnecessary description so as to make the subject matter of the present invention clear.

An embodiment of the present invention proposes an information/contents provision and sharing system (such as a Social Networking Service (SNS)) defined by a content post/access/visualization mechanism based on metadata (e.g. new rules and restriction conditions for user experiences that are different, simple, and fun, and realistic) while guaranteeing relevance of the information sharing method. The new information/contents sharing system may be managed by means of a server or operate based on the resources of terminal devices such as peer to peer (p2p) system. Although the description is directed to the server-based embodiment herein, it is not ruled out to use the p2p-based communication.

In the following description, the term 'message' may be used to mean a text message, a photo, a video, or a combination thereof. The term 'sender' may be used to mean a user who sends or posts a message or a User Equipment (UE) used for sending/posting the message. The term 'receiver' may be used to mean a user who sends the server a request for access to the message stored in the server or a UE which transmits the request for access to the server.

In the following, 'geolocation position' or simply 'position' may be defined. The geolocation position may be defined as location information based on GPS information, GSM/CDMA (Cell-ID) information, Wi-Fi information, IP address, RFID information, BT/BLE information, or any combination thereof. The location information may be obtained using a method determined differently depending on the user's situation (indoor or outdoor). In the following description, the geolocation position or position may be interchangeably referred to as location information.

Figure 1A:
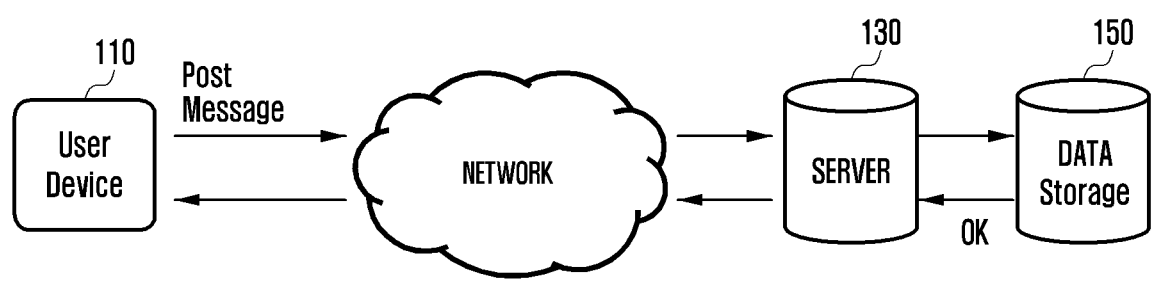
FIGS. 1A and 1B are diagrams illustrating an example client-server system according to this disclosure.
Figure 1B:
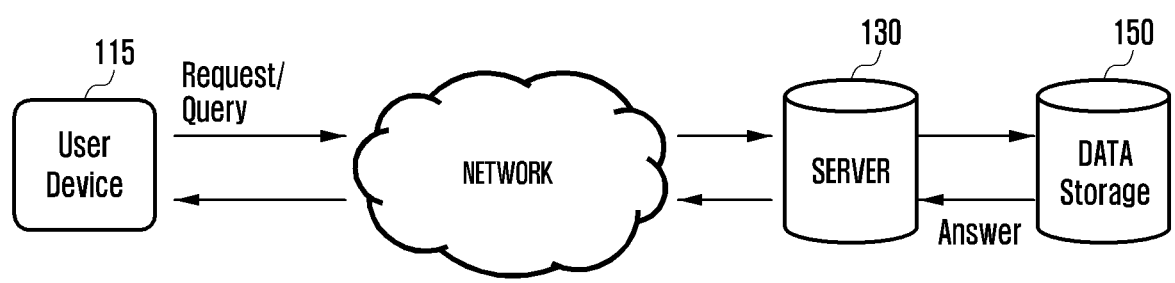

FIGS. 1A and 1B are diagrams illustrating an example client-server system according to this disclosure. Referring to FIGS. 1A and 1B, the system includes user devices 110 and 115, a server 130, and a data storage 150. The data storage 150 can be implemented inside or outside the server 130. The user device is referred to as a client. The user device is referred to as a terminal. The user device 1 110 is a sender (sending device or content posting device), and the user device 2 115 is a recipient (receiving device or content reception device). In this case, the user devices 110 and 115 are identical in type with or different from each other. If the user devices 110 and 115 are portable devices, the network is a mobile communication network.

The user uses a user device such as a tablet or smartphone or another type of device to execute an application. It is assumed that the service provided by the system is managed by the server 130 based on the contents stored in the data storage. The user device 1 110 (sending device) sends the server 130 a request for posting a message. The server 130 requests the data storage 150 to store the information to be posted by the user device 1 110 based on the request received from the user device 1 110. The data storage 150 sends a result of processing the request from the server 130 as a response message. The user device 2 115 sends the server 130 a content request/query message. The server 130 requests the data storage 150 for the content based on the message received from the user device 2 115. The data storage 150 sends a response in reply to the content request from the server 130. The data storage 150 stores various metadata. The metadata S1, S2, and S3 that is stored in the data storage are described in detail herein.

Figure 2:
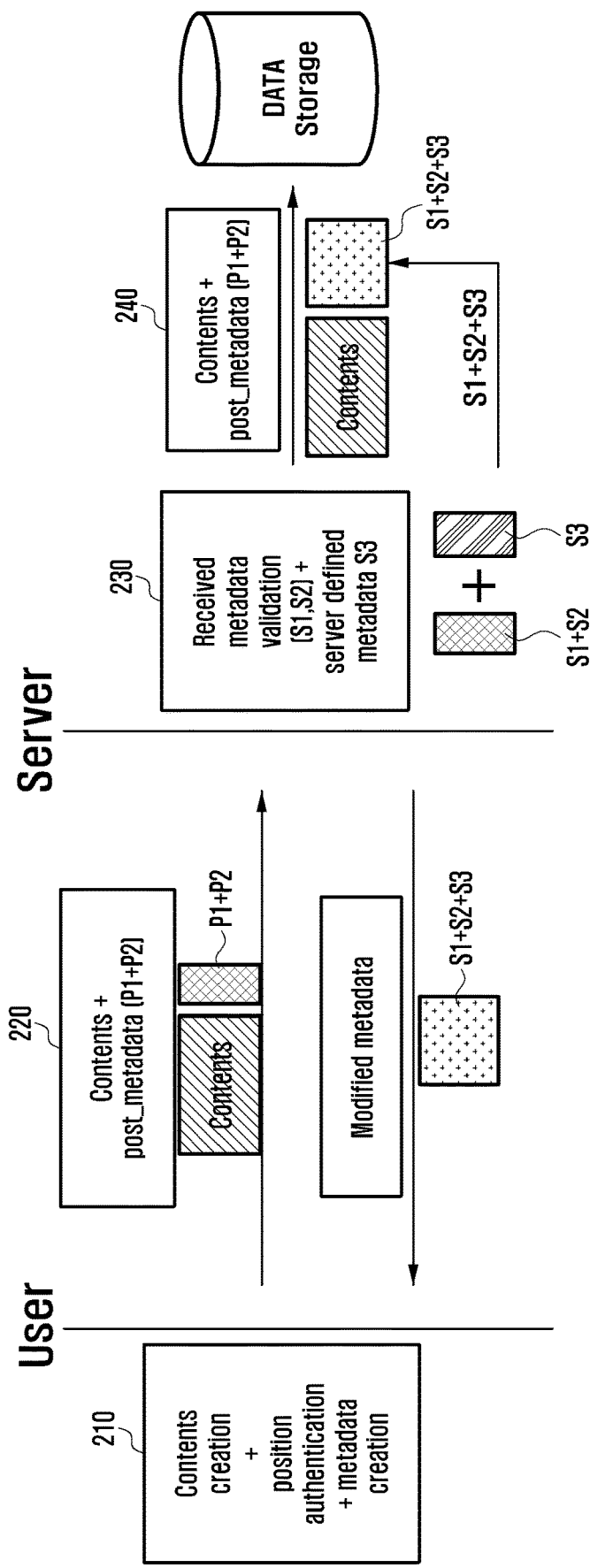
FIG. 2 is a diagram illustrating an example message post procedure according to this disclosure.

FIG. 2 is a diagram illustrating an example message post procedure according to this disclosure. Referring to FIG. 2, the user generates content, authenticates the location of the user device, and generates metadata using the user device at step 210. The user sends (or posts) the generated content and metadata (P1, P2) to the server at step 220. Here, P1 and P2 denotes the metadata corresponding to respective S1 and S2 described herein. The informations S1 and S2 are stored in the server or data storage based on the metadata P1 and P2 which the user sends by means of the user device.

The server verifies the validity of the metadata S1 and S2 transmitted by the user device and, if necessary, modifies the metadata at step 230. The server also defines new metadata S3. The server stores the content received from the user device and metadata (S1+S2+S3) in the data storage at step 240. The server transmits a response to the user device in reply to the post request at step 250. If the metadata is modified, the response includes the information on the modified metadata. If metadata is added, the response includes the information on the added metadata.

Figure 3:
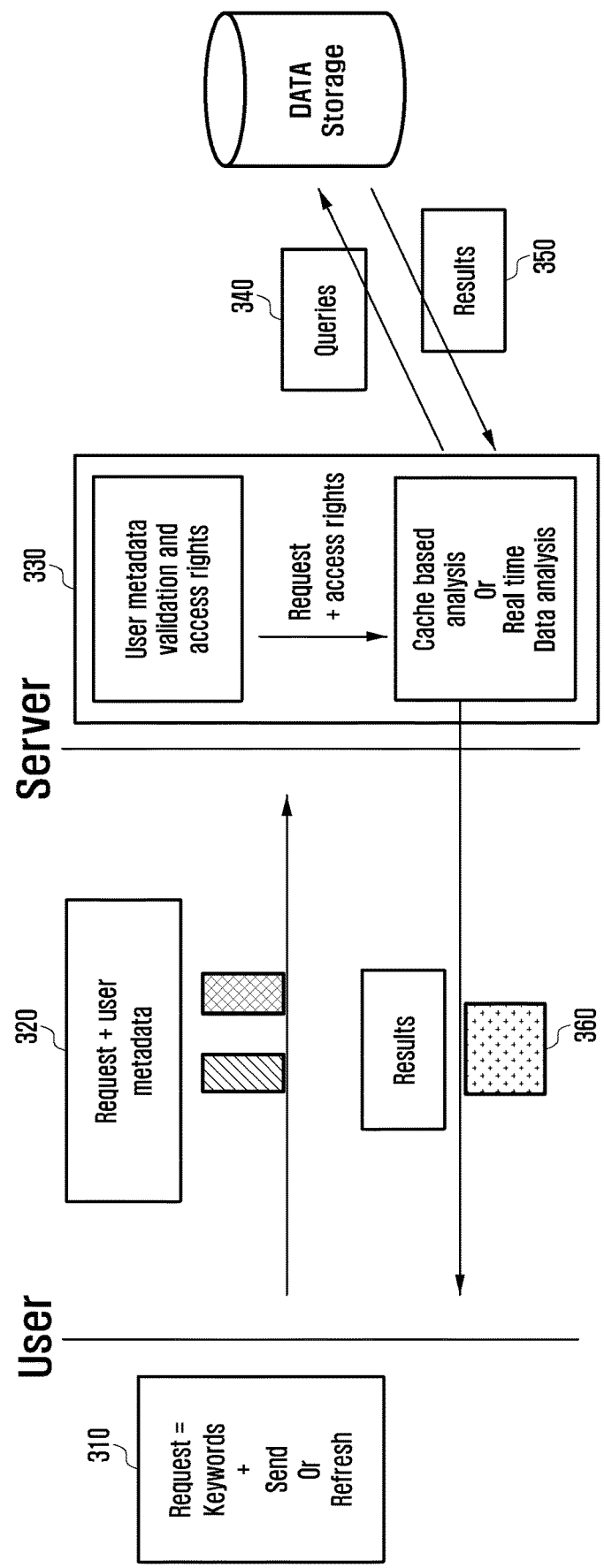
FIG. 3 is a diagram illustrating an example message request procedure according to this disclosure.

FIG. 3 is a diagram illustrating an example message request procedure according to this disclosure. The user device requesting for the content or message (recipient device) generates a request to be transmitted to the server at step 310. The user device sends the server its metadata information along with the request at step 320. If the request is received from the user device, the server determines whether the metadata transmitted along with the request is valid to verify access right at step 330. The server performs cache-based data analysis or real time data analysis based on the valid metadata and access right. The server queries the data storage about the content based on the request from the user device at step 340 and acquires the result at step 350. The server provides the user device with the acquired result at step 360. In an embodiment of the present invention, the server provides the service using the metadata of the sending device and the metadata of the receiving device.

The metadata aforementioned in FIGS. 2 and 3 are described in more detail herein. The SNS service or information provision method provided by means of the user device and the server are also described in following embodiments hereinafter. The aforementioned metadata is described herein. The metadata is categorized into the metadata generated when the sending device posts a message and the metadata generated when the receiving device requests for a message. The metadata generated by the user device (P1, P2) is used as information for generating the metadata (S1, S2) modified or stored by the server. The metadata which is stored, modified, and added by the server is stored in the data storage. The messages that are stored in the data storage includes the information such as Saved_Metadata as follows.

[S1] includes sender information including location X when the message is transmitted and message posting time T0. The message transmission location X is the location of the user or the sending device when the user posts the message by means of the sending device 110. The posting time includes the information on the instantaneous time when the user sends the message. [S2] User selection on how to display the message (position Y or appearance area Area_Destination). The message is posted at location Y or Area_Destination. It is the location where the message is displayed in the location information area (such as a map of an application). Here, Y is a concept contrasting to X. That is, X denotes the location when the sending device transmits or posts the message while Y denotes the location where the location information is displayed in the location information area. X and Y can be identical with or different from each other. [S3] includes addition or other information.

Life_expire(t)=T0+timeL(t), content, or time period during which the content or message is saved in the server or application is based on the popularity. Here, Life_expire(t) denotes the time when the validity of the posted content or message expires. If the validity expires, this includes deletion of the content from the server and restriction of the access of other users. T0 denotes the time when the content is posted. The timeL(t) is the time updated from the default setup time (timeL(T0)) based on the popularity.

For example, the default setup time (timeL(T0)) is set to 2 hours. In this case, the default validity time of the content is 2 hours and is updated by reflecting the popularity. If the popularity of the content increases, the timeL(t) increases and, otherwise if the popularity of the content decreases, the timeL(t) decreases. For example, the timeL(t) is configured so as to increase by 1 minute when the number of hit on the content increases by 1, increase by 10 minutes when the content is recommended, and decrease by 5 minutes when the content is disliked. The timeL(t) is configured by the user so as to be updated in various manners. The total validity time of the content is determined by adding the validity time updated based on the popularity of the content to the content posting time.

For color type the message or content is displayed at a location information area of the application. At this time, it is displayed in a certain color determined depending on the location information. For example, it is configured to display the message or content in blue color when the location of the sender and the location where the message or content is displayed in the location information area are within a predetermined range and in black color when the location of the sender and the location where the message or content is displayed in the location information area are out of the range. It is also configured to display the message or content in grey color when the no location for displaying the message or content in the location information area of the application is configured. The advertisement and sponsorship messages are configured to be displayed in red color. The color type is applied for intuitive recognition of the user in an embodiment. In addition to the color type, other diagrammatic properties are configured. That is, various types of diagrams are used in addition to the types of colors to distinguish among the relationships with the location information or properties of the messages.

State type related to dead or alive (timeout or not), dropped, or taken. The metadata includes the information as follows. (S1) sender location (X): This information is acquired directly from the location information of the sending device. The location information mentioned in defining the geolocation position is used. It is also possible to acquire the location (X') of the receiver in a similar way.

(S1) relates to a sender location error that is required by means of a geolocation position authentication program running on the device. (S1) also relates to posting time (T0) such as Timestamp sent by the sender. (S1) in the case of being accepted by the sender, it is possible to allow other contexts such as network connectivity, battery level, device type, OS type, IP address, and MAC address. (S2) Message display location (Y) is a location of a message. This also relates to the location where the message is displayed on the location information area (map). This is determined by the user touching a location on the map manually. This is also determined by the user device automatically at its current location. The message display location is also determined using a certain location information input method other than the touch input method. Optionally, instead of or in addition to Y, an area to which the message is sent (Area_Destination) is defined. For example, the sender sends a message with or without explicit location Y to Seoul.

(S2) Preference/profile of sender: Information sharing rule, private information setting, information filtering rule, and the like. For example, the sender sets the sender profile to reject using its own location information. (S2) Message type: There is a normal message, a sponsor message, and a special message. The normal message is a message of providing usual information. The sponsor message is a message for advertisement (game launch, sale information, etc.), special right provision, and flag capable of dragging or dropping a message on the map, etc. The special message is a message having a special capability of game, entertainment, collection, and the like.

(S2) Message with link (directional link of the message for other messages): If there is a "response" to the message, the message is linked to the corresponding message or the response message referenced. This includes the directional links among the messages that are generated by the user manually (such as to mark the consecutive points on the map for creating a path route for a walk).

(S2) Message-specific access conditions includes an Id of receiver (such as e-mail address or user id) when the message is sent to specific persons or a specific group of persons as private message. Location restricted Area_Access for receiver when search/access request is transmitted. For example, the message is configured to be opened by only the users located in Seoul or within a distance range of 200 m around the message location Y. Such a parameter is used for the commercial purpose. In the case of advertising a store located in a specific area, the information on the store is configured so as to be provided to the users located within a predetermined range around the store.

Time restriction to receiver when receiver/access request is transmitted: For example, the message is configured to be shown between 12:00 and 14:00. Message-specific password or tag. Usual access condition as configured in family contact list of sender. A few access level is defined along with level-specific access conditions (such as access to location of message, access to title of message, access to type of message, and full access to message). The sender selects a filtering condition for the receiver. For example, the message is configured so as to be shown by female users or users using Chinese as default language. The use of such conditions can be restricted (such as for commercial use).

(S3) is a function of {X, Y} that determines the use of category symbols. The distance between X and Y calls the color (blue or black) to be used. Another type of color is configured depending on whether the distance is equal to or less (greater) than the threshold value Th_Colors. Assuming Th_Color=100 m, if the distance between X and Y is equal to or less than 100 m, this is determined as locally dropped and thus the message or message icon is displayed in blue color. If the distance between X and Y is greater than 100 m, this is determined as distant dropping and thus the message or message icon is displayed in black color. The sponsored commercial messages are displayed in red color.

As described above, the message distinction is not limited to the type of color but made in various ways, such as using the type of diagram determined depending on the distance between X and Y. (S3) timeL: It is possible to set a default validity time. The default validity time starts at the posting time. It is also possible to set the default time value at the posting time. For example, the default time is set to 2 hours. If there is no change in popularity, the validity time of the message expires in 2 hours. The validity time increases or decreases depending on the change of the popularity (such as increase by 1 minute when the number of hits on the message increases by 1, increase by 10 minutes when the message is recommended, and decrease by 5 minutes when the message is disliked). The validity of the message expires at time t. The expiry of the validity is referred to as 'dead'. The message is dead at time t. t=T0+timeL(t)

(S3) message score: This depends on the profile of the sender. General statistics on visit/feedback (number of hits, number of likes, and number of dislikes), value of the timer, and profiles related to persons who liked/recommended the message. (S3) State of message: This is set to 'dead' or 'alive' based on whether the timer has expired. It is also possible to set whether the message is dropped or taken (such as using game or add). The above described data (X, Y, Area_Access, X', T0, and time L) is used for providing the services as follows. The server provides data filtering, message display method (location indicator color, sign, and the like), recommendation system installation (data arrangement/clustering), competitive price, and target service.

A description is made of the service provision method according to an embodiment of the present invention in detail with reference to FIGS. 4 to 12 herein. In an embodiment, a terminal is used as the user device, and the description is made based on the content displayed on the screen of the terminal. The embodiments of FIGS. 4 to 12 can be implemented independently or integrally.

Figure 4:
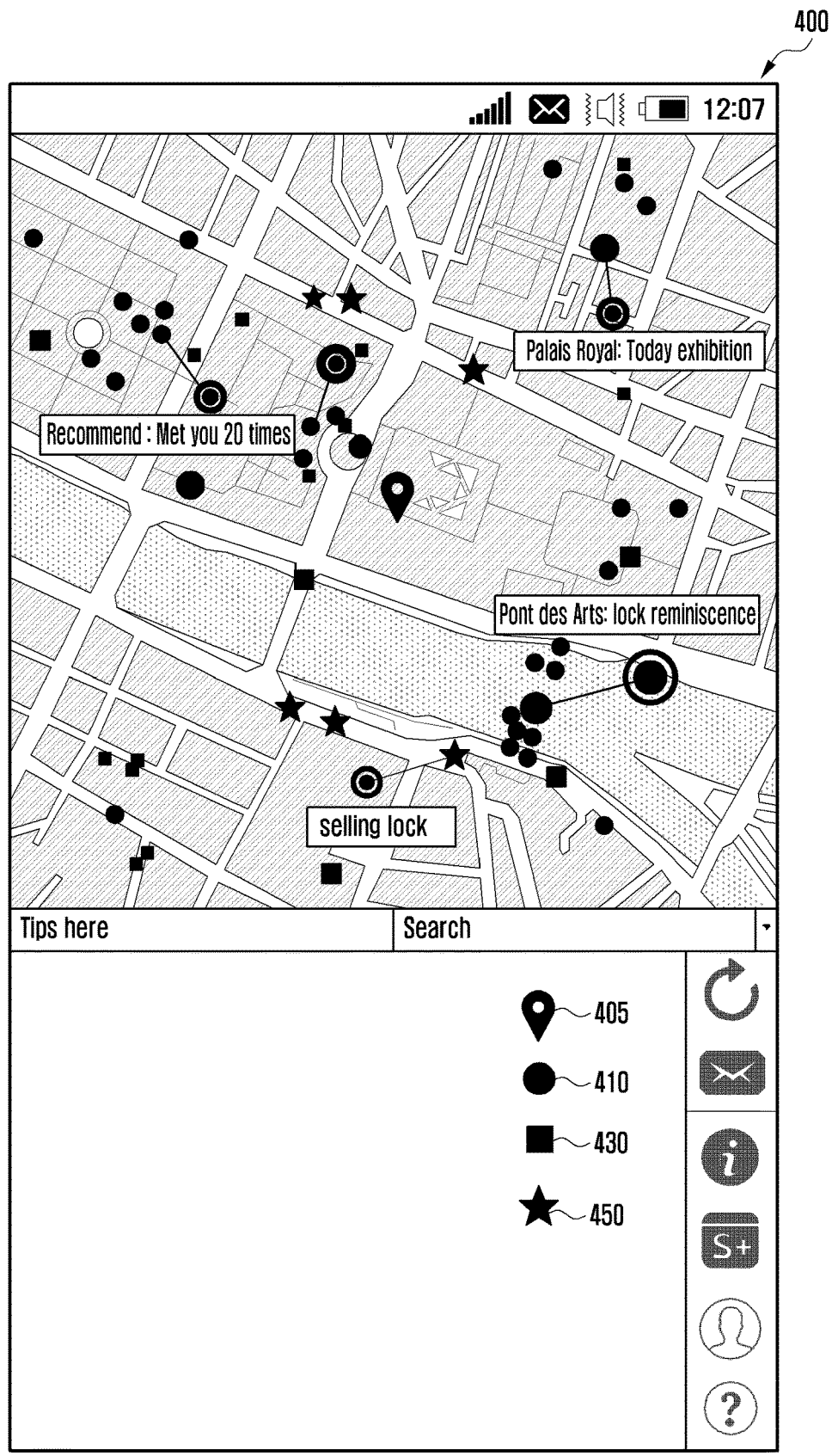
FIG. 4 is a diagram illustrating an example screen display for explaining the location-based message display method according to according to this disclosure.

FIG. 4 is a diagram illustrating an example screen display for explaining the location-based message display method according to this disclosure. Referring to FIG. 4, the screen 400 of the user device displays icons representing messages on the location information area (such as in a map). In FIG. 4, the icons representing the messages are categorized into three types. The user posting the messages categorizes the icons 410, 430, and 450 based on the location information used in posting the messages to the server. The types of icons are not limited thereto but can include other icons representing various functions according to the user's or server operator's settings.

Basically, it is possible to use the aforementioned function of $\{X, Y\}$. The $\{X, Y\}$ function is a function for categorizing the messages based on the relationship between the sender location X and the message display location Y. The icons are distinguished by color and/or shape. The function of the sender location and the message display location Y are used along with a threshold. Suppose the case where the threshold is set to z meter. When posting a message ('message' is used as a concept including various types of contents) to the server, the sender sets the display location Y of the content or message to be posted on the location information area (map). If the distance between the sender location X and the message display location Y is equal to or less than the threshold (z meter) at the time when the sender posts the message, the icon representing the message is displayed in the shape as denoted by reference number 410.

If the distance between the sender location X and the message display location Y is equal to or greater than the threshold (z meter) at the time when the sender posts the message, the icon representing the message is displayed in the shape as denoted by reference number 430. In the case of a special message (such as an advertisement message) which does not use the function of the sender location X and the message display location Y, the icon representing the corresponding message is displayed in the shape as denoted by reference number 450.

Figure 5:
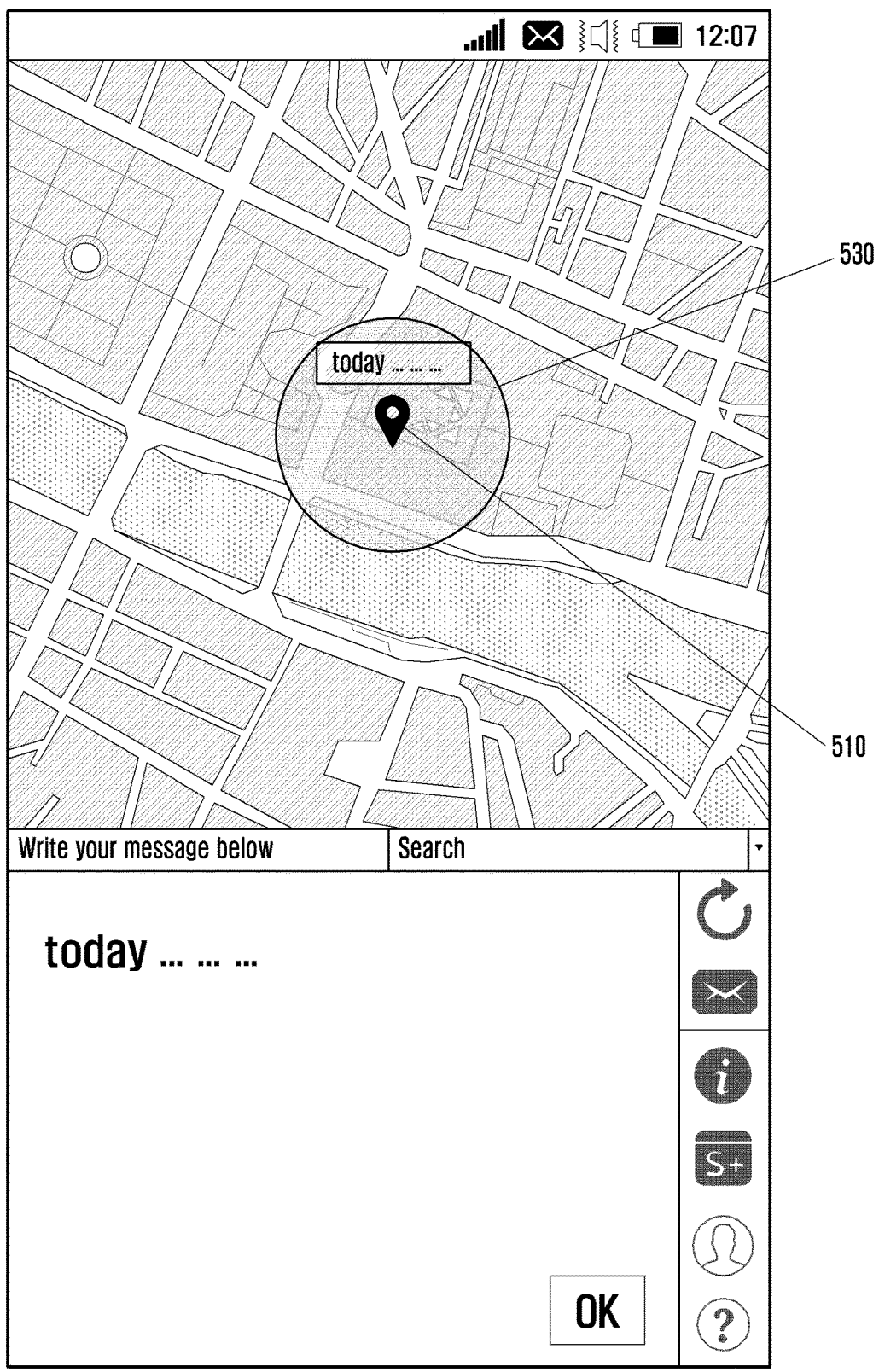
FIG. 5 is a diagram illustrating an example screen display for explaining a method of inputting a message on a location information area according to this disclosure.

Referring to FIG. 5, for instance, the threshold distance from the sender location X is set as denoted by reference number 530, and the message posted by the sender is marked therein as denoted by reference number 510. For example, if the sender writes a message and drops the message inside the area as denoted by reference number 530, the message icon shaped as denoted by reference number 410 of FIG. 4 is displayed. If the sender writes a message and drops the message outside the area as denoted by reference number 530, the message icon shaped as denoted by reference number 430 of FIG. 4 is displayed. The message is placed at a certain position on the map in the way of drag and drop. For example, in order to place the message at the current user location X or inside the area defined by the threshold, the sender selects the 'send' or 'OK' button after completing composition of the message or content such that the message is dropped at the sender location X or inside the area defined by the threshold. In order to place the message at a specific position on the map, the sender touches at the position on the map or drags and drops the message at the position, or searches for the position.

The user of this location-based service (or location-based SNS service) checks, in association with a message which at least one SNS user has posted, the relationship of the location of the user at the time when the user has posted the message and the location where the message is displayed Meanwhile, the threshold and the icon display method are determined by the sending device, the receiving device, and the server independently. For example, the sender sets the threshold for a message posted by its user and icons to be presented according to the $\{X, Y\}$ function in association to the threshold. The threshold for displaying the icons of the message is applied to the terminals of other users using the same service as the sender posted the message.

The server sets the threshold (z) to display the icon according to the $\{X, Y\}$ function result. That is, the server receives the message and metadata information of $\{X, Y\}$ from the sending device and configures to display the icon using the threshold (z) set by the server and the metadata information on the message received from the sending device.

Finally, the receiving device sets the threshold (z). In this case, the server provides the receiving device with the message and the metadata about the message such that the receiving device sets the threshold to display an icon corresponding to the message. In the case that each receiving device sets the threshold (z) in the state that the server has the message and metadata about the message, the server provides the receiving device with the $\{X, Y\}$ function result based on the device-specific threshold.

The size of the icon displayed on the location information area is determined differently depending on the popularity of the message. For example, if the numbers of hits and recommendation to the message are high, this means that the message has a high popularity so as to be displayed as an icon large in size.

It is possible to filter the type of the icon to be displayed according to the selection of the receiving device. For example, only the icons as denoted by reference number 410 or 430 is displayed. It is possible to display the icons of the messages located within a predetermined distance or fulfilling a predetermined popularity condition.

In FIG. 4, the message which the sender has dropped is displayed in the shape of the icon as denoted by reference number 405 so as to be distinguished from the messages dropped by others. It is also possible such that the message dropped by the sender is displayed in the shape as denoted by reference number 405 while the messages dropped by other users are displayed in the shapes as denoted by reference numbers 410, 430, and 450. In order to show the relationship between the sender location X and the message display location Y, different color information is used. It is also possible to mark the message selected or picked by the user distinctly. For example, it is possible to indicate whether the message is selected by showing or hiding a border of the original diagram as denoted by reference number of FIG. 4.

A description is made of the time when the created message is displayed in the location information area. In an embodiment of the present invention, a timer is used. Basically, the user sees the message alive during the validity time period. Each message has a timer defining the validity time period. The state of a message is categorized before and after the expiry of the timer. The message in the alive state in which the service user accesses transitions, if the timer expires, to the dead state in which the access to the message is restricted. When the timer expires, the message is deleted or expressed with a new icon changed in shape (such as a dead symbol at the location Y in the location information area). The validity time period is $t=T0+timeL(t)$ as described above. Since the timer equation and $timeL(t)$ have been described above, detailed description thereof is omitted herein. In the case of using the timer, the validity time period of a high popularity message is relatively long, and the validity time period of a low popularity message is relatively short. The validity time period (or life time) is used for determining the popularity rank.

Figure 6:
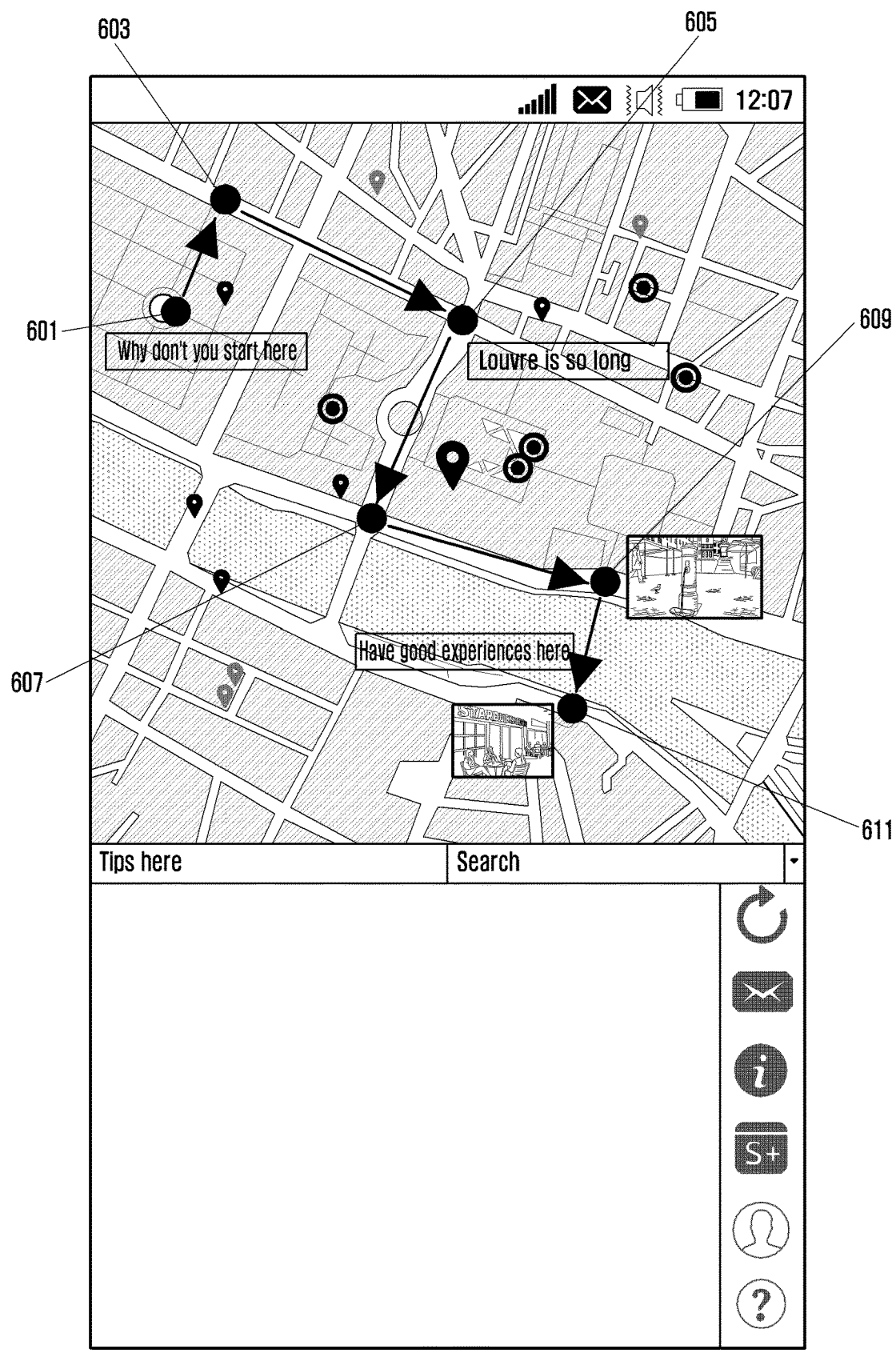
FIG. 6 is a diagram illustrating an example screen display for explaining the message link method according to this disclosure.
Figure 7:
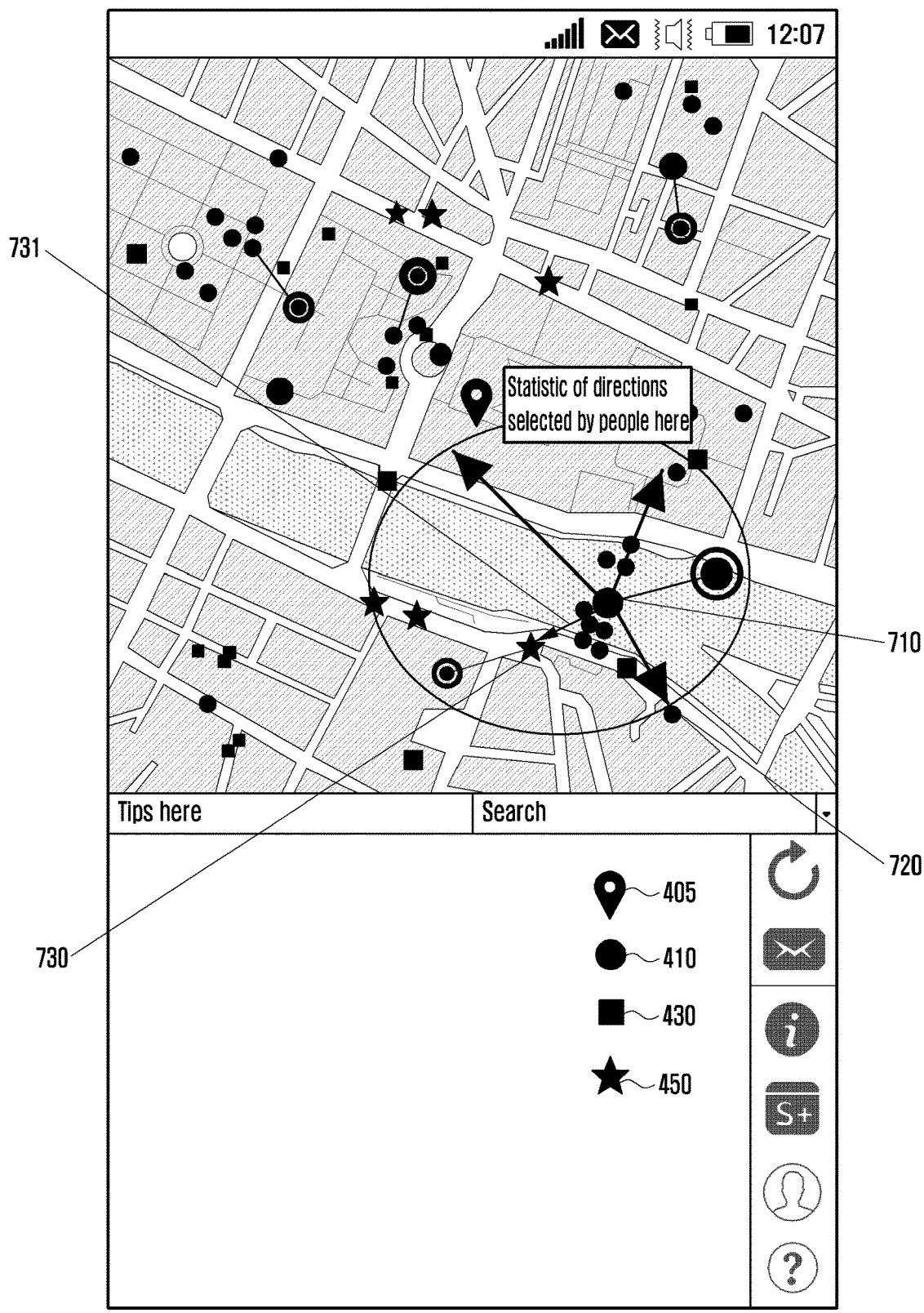
FIG. 7 is a diagram illustrating an example screen display for explaining a movement path recommendation method according to this disclosure.

A description is made of a message link method hereinafter with reference to FIGS. 6 and 7. FIG. 6 is a diagram illustrating a screen display for explaining the message link method according to an embodiment of the present invention, and FIG. 7 is a diagram illustrating a screen display for explaining a movement path recommendation method according to an embodiment of the present invention. The user creates a link starting from the first location to the second location to define the order (of event/guide). The type of the link is determined as a linear type, tree type, or a more complicated type.

Referring to FIG. 6, the messages 601 and 603 is linked. The messages is linked to express the relation between the messages or recommend a movement path as shown in FIG. 6. In FIG. 6, a path created by connecting the location having messages in the order of 601→603→605→607→609→611 is recommended. In the case that the service user moves to a specific location, the direction recommendation information is provided as above. The movement path recommendation information is received from the sender. Also, the server provides the high popularity location information as the recommended movement path in response to the request of the user. At this time, the aforementioned information such as the number of hits and recommendations on the message is used as popularity rank.

Referring to FIG. 7, it is possible to recommend movement to a specific location based on the movement information of the users at a specific location. For example, in the case that the service user is located at the first location 710, the server provides the user located at the first location 710 with the information on the second location 720 to which the user is moving. At this time, there are one or more second locations. The server recommends the second area 720 based on the information of the movements of the users from the first location to other locations. In order to recommend the second location 720, an arrow is used. The information on the second location 720 to move is provided at the first location 710. At this time, the recommendation priority is expressed using the information such as the color depth and line boldness of the arrow. For example, the movement path used most frequently by the users is expressed with a deeper color or bolder line arrow.

Meanwhile, the server recommends the next location based on the location information of the user who uses the application. At this time, the location information is the location information reported by the user device in real time or at a preset interval. The movement path is created using the location information at the time when the message is posted. That is, if the user visited the first location 710 posts the message at the first location and then moves to another location and posts the message again, the server predicts the movement path of the user based on the location information at the times when the messages have been posted.

In the case of recommending a movement path for a commercial advertisement, this movement path is displayed so as to be distinguished from the movement paths recommended based on the normal user data. The third location 730 is a commercial advertisement location recommended for the users visited the first area 710 to visit. The icon representing the commercial advertisement message is distinguished from the general icons as described with reference to FIG. 4. Also, the movement path recommendation for the commercial advertisement location is made distinctly with the arrow 731 different in shape or color from those of the general movement paths recommended based on the normal user data.

Using the methods of FIGS. 6 and 7, it is possible to increase the relationship among the locations where the messages are posted. A description is made of the message display method according to an embodiment of the present invention. If the amount (number) of the information in a given area is too large, the recommendation system plays an important role to maintain/improve the user experience quality. Since displaying all of the data in an area causes inconvenience to the users, it is important to control the information amount to be displayed according to a predetermined rule. That is, although service or SNS users post a lot of informations, the server has to determine appropriate amount of information through filtering.

In an embodiment, the basic recommendation method is implemented in such a way of displaying n1, n2, and n3. [n1] Highest level contents (popularity are based on residual life "T0+timeL(t)−t." [n2] are most recent content (rank based on t−T0). [n3] are randomly selected contents. Among [n1], [n2], and [n3] contents, only specific types of contents are displayed depending on the filtering option. That is, it is possible to display only [n1], [n2], or [n3] contents. It is possible to display any combination of [n1], [n2], and [n3] contents. The messages displayed in the embodiments of FIGS. 4 to 7 corresponds to [n1], [n2], and [n3] contents.

A description is made of the exemplary case of displaying any combination of [n1], [n2], and [n3] contents. In the case of displaying a large number of messages, the messages is categorized into most popular messages (n1), most recently posted messages (n2), and randomly selected messages (n3). In the case of displaying the messages based on the popularity, it is possible to provide reliable information. In this case of providing based on only the popularity, however, the same information is provided at the same location and thus it is necessary to display the messages having the recent information at the location on the basis of the message posting time. In this case of displaying the messages based on only the popularity and posting time, the types of the information are restricted and thus it is necessary to select the messages randomly.

Here, T0 denotes the message posting time, timeL(t) denotes the validity time period, and t denotes the current time. The messages or icons representing the messages are displayed on the map (in the form of symbol/logo/shape such as point, circle, and triangle). Parts of the messages or icons are displayed along with the information explicit in comparison to other messages. For example, the message information such as the title of the message, part of the content of the message, and the type of the message is presented along with the icon.

In order to apply the result in real time, n1+n2+n3 are displayed gradually. For example, it is considered that ten messages are displayed first and then one message is added every ten seconds. Since too many messages causes confusion, and the number of messages to be displayed are restricted. For example, if it is configured to increase the number of message during 1 minute, the number of messages increases by 1 from the initial 10 messages every 10 seconds such that the total number of messages displayed after the elapse of 1 minute becomes 16.

Afterward, in order to display a new n1+n2+n3 set, a refresh event occurs. The refresh event occurs automatically according to the settings of the user device or manually in response to a user input. The refresh event also occurs according to the refresh command transmitted by the server. The user command triggering the refresh event is input through an input unit of the user device.

The n1+n2+n3 set are substituted partially other than wholly. It is possible to maintain the messages selected by the user and delete the remained messages so as to receive message recommendation. The message recommendation is received after deleting the selected messages. It is also possible to use of a method for substituting a new message for one of the currently displayed message every predetermine time when the number of messages reaches the maximum limit.

The user sends at least one two types of requests by means of the user device. That is, the user device transmits a request made with a refresh button and a request made through a keyword-based search. If the refresh request is input, all the informations disappear to be updated on the map. Particularly, the most recent contents are recommended and displayed along with their priorities. Meanwhile, the contents to be refreshed are changed according to the configuration.

In the case that the keyword-based request is input, the priorities of the all accessible location informations (default distance Th_Neighbour, such as within the neighboring area defined by 1 km or the map area defined by MapViewInfo) are updated according to the keyword input, and the update result is displayed according to a basic display rule. In the message display method using [n1], [n2], and [n3] as described above, an additional message [n4] is recommended. The device message encounter-based recommendation is regarded as an additional information provision method based on the statistical records among the metadata of the messages posted by different users. Particularly, the location information [X, Y] and T0 is used among the metadata.

For example, it is possible to check the relationship between users or between messages posted by different users based on the metadata. It is possible to check how many times the user A has approached the message posted by the user B, how closely the subject of the posted message and the personal profile/interest or past activities are related to each other, and how long the time interval between the message creation time (such as in a day) and local time of the user device is. It is possible to recommend the message posted by the other user having the close relationship with the user in such a way of showing the message of the recommended user directly or indirectly. A description is made of the recommendation method based on the encounter between messages or users hereinafter with reference to accompanying drawings.

Figure 8:
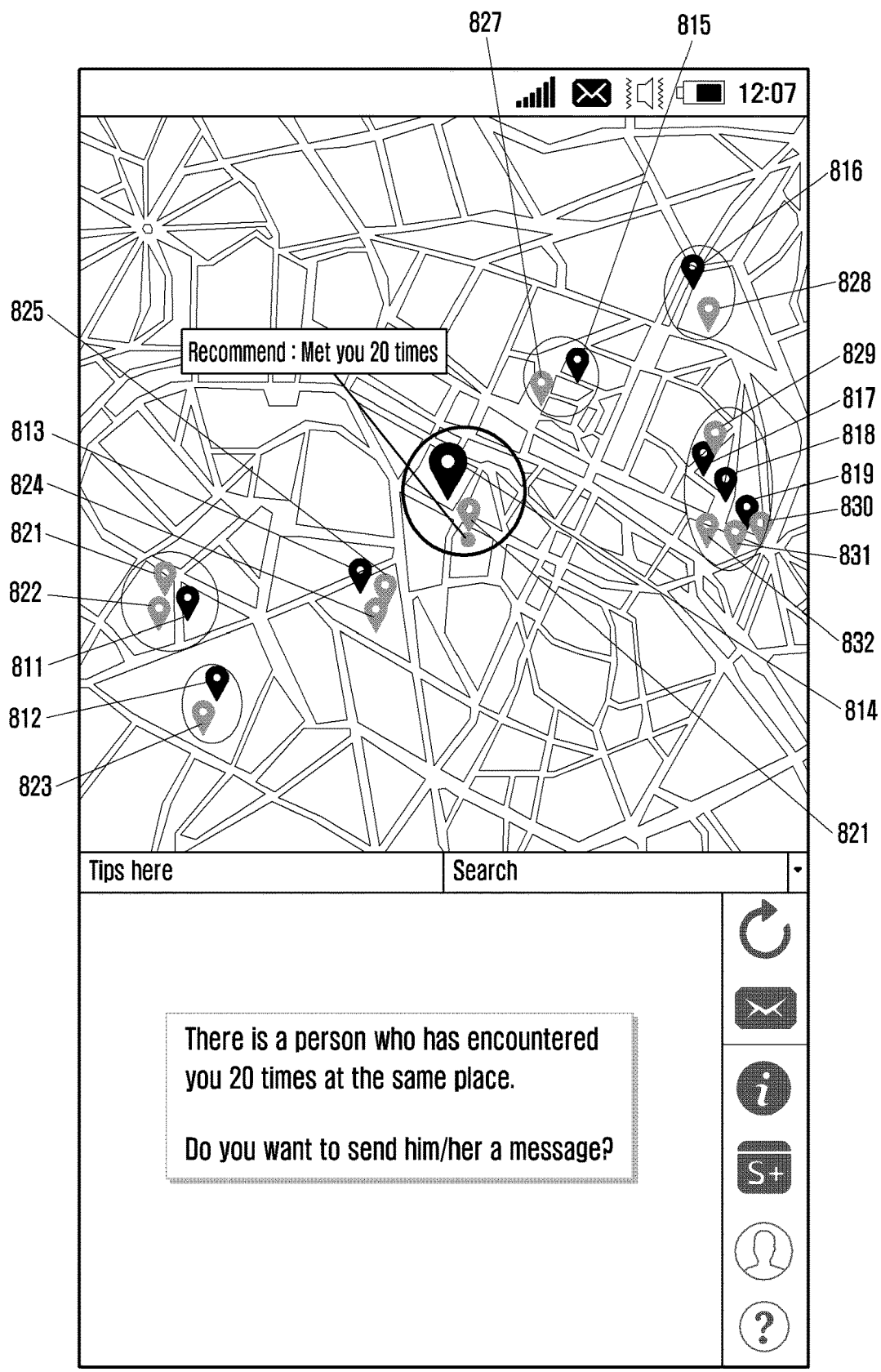
FIG. 8 is a diagram illustrating an example screen display for explaining a message encounter-based additional information recommendation method according to this disclosure.

FIG. 8 is a diagram illustrating an example screen display for explaining a message encounter-based additional information recommendation method according to this disclosure. Referring to FIG. 8, the messages 811, 812, 813, 814, 815, 816, 817, 818, and 819 posted by the user or user device A and the messages 821, 822, 823, 824, 825, 827, 828, 829, 830, 831, and 832 posted by the user or user device B are displayed.

It is possible to check the encounter between the messages posted by the user A and the messages posted by the user B based on the metadata [X, Y] relationship included in the individual messages. It is also possible to use the difference of user-specific message metadata X values and difference of user-specific message metadata Y values. If the difference between the X values or Y values is equal to or less than a predetermined threshold, this is regarded as the encounter of the users A and B.

It is configured to make a recommendation when the threshold for recognizing the encounter of the users A and B is 100 (encounter threshold) and the number of encounters is equal to or greater than 20 (recommendation threshold). It is possible to count the encounters of the users A and B using X or Y. FIG. 8 shows the encounter of messages 811 and 821 and the encounter of messages 811 and 822. Similarly, it is possible to count the encounters of the respective messages. Each device or server stores the count of the encounters of users A and B. As the count increases, it is updated. It is possible to determine whether the count has reached the predetermined recommendation threshold. FIG. 8 shows a case where encounter count is set to 20 in a predetermined area on the map.

If the encounter counts of different devices reach the predetermined recommendation threshold, the server provides the information on the counterpart. At this time, it is possible to provide the information on the counterpart after inquiring whether each user has requested for the information on the counterpart.

If the count reaches the recommendation threshold, this is interpreted that the different users are closely related. Accordingly, it is possible to recommend the user who is closely related in the SNS service or provide a supplementary service of sending a message to the recommended user. If the users are closely related, this is interpreted that they has similar flow lines or life radii and thus the user is receive the SNS message posted by the other user who is closely related with him/her.

FIG. 8 is directed to the case of determining the relationship between users based on the message locations to provide supplementary service. The encounter between the users is determined based on the correlation between subjects of the posted messages and/or creation times of the messages as well as the message posting locations for the encounter count and recommendation.

In an embodiment of the present invention, it is possible to configure so as to recommend a message according to the user profile/preferences. The user profile includes basic personal information such as age, gender, address, and nationality of the user. The preferences include the information on the interest of the user. The information is configured interactively. The message is configured so as to be shown to the receivers having specific profile/preferences from the viewpoint of the sender or shown to the senders having specific profile/preferences from the viewpoint of the receiver. It is obvious that such configuration is done at the server. The sender and receiver send the server the request such that the server actually performs filtering on the messages.

A collaboration filtering method is applied in this way when the messages are displayed. That is, it is possible to use the collaboration filtering method for recommending and displaying the messages posted by the person who is highly related with the user as well as recommending the message based on n1, n2, and n3.

Figure 9:
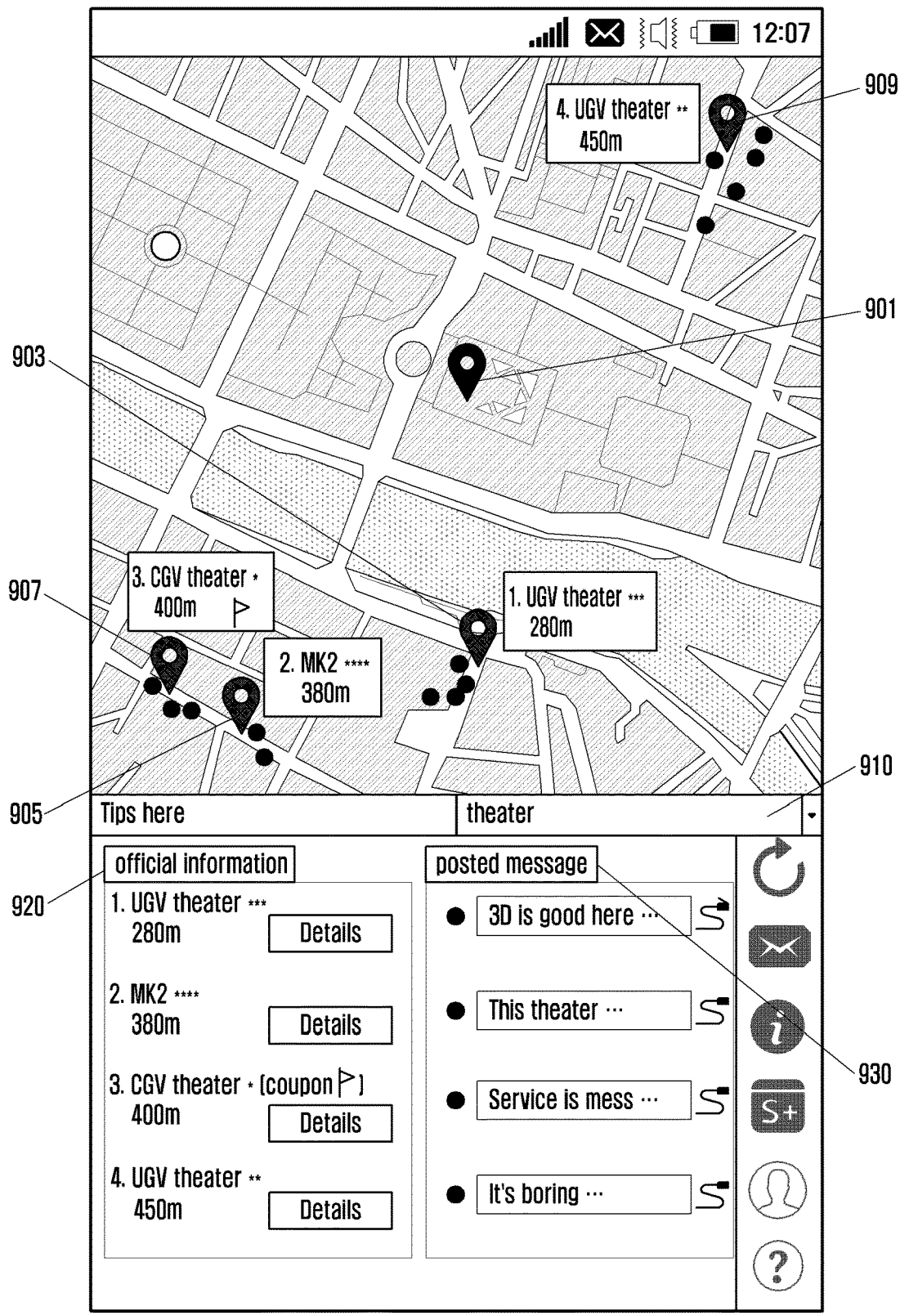
FIG. 9 is a diagram illustrating an example screen display for explaining a keyword-based message filtering method according to this disclosure.

FIG. 9 is a diagram illustrating a screen display for explaining a keyword-based message filtering method according to an embodiment of the present invention. A method of recommending and displaying the message associated with the keyword input by the user is described with reference to FIG. 9. The user enters a search keyword in the keyword input box 910. Suppose that the keyword "theater" is entered. The server provides the user with the official information about theaters and the theater-related information posted by the users using the application (such as SNS). At this time, the above information is searched in a predetermined area range configured by the current user. For example, the currently displayed map area or a specific area of the map which is selected by the user is configured as the area range. It is also possible to configure the time when the message is written as a search range.

The server provides the official information 920 related to the keyword and the posted message 930. The official information includes the general information related to the keyword. For example, the official information includes the general information such as distance to the theater from the search location, address of the theater, and theater building information. The office information 920 includes location information related to locations 901, 903, 905, 907, and 909. The posted messages are the messages written by the users with the application. Meanwhile, the icons representing the respective messages are displayed on the map. The icons are displayed according to the [X, Y] function result as described with reference to FIG. 4. Accordingly, the user who has entered the keyword checks the [X, Y] function relationship of the messages written by other users.

Figure 10:
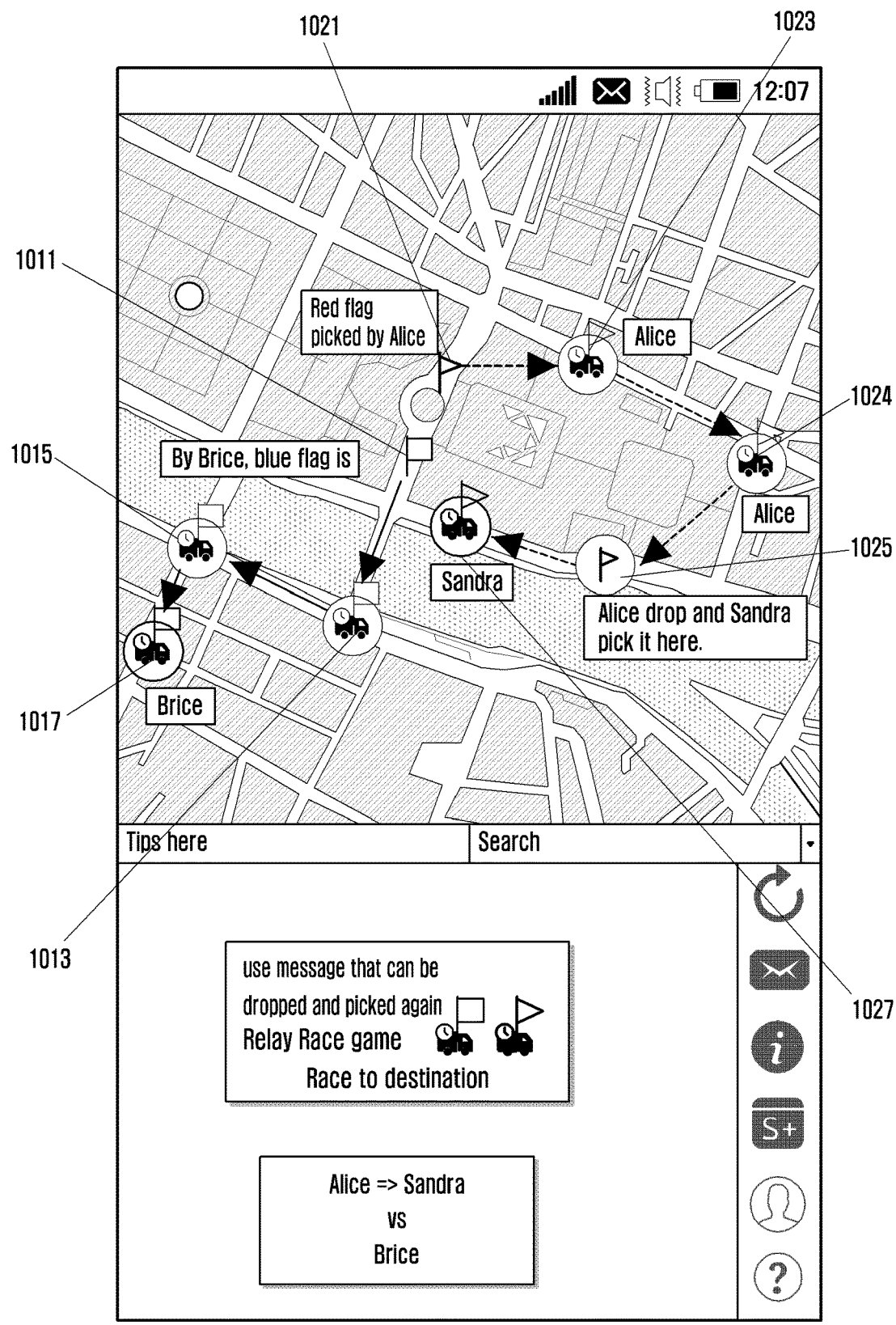
FIG. 10 is a diagram illustrating an example screen display for explaining a gaming method according to this disclosure.

FIG. 10 is a diagram illustrating an example screen display for explaining a gaming method according to this disclosure. The embodiment of FIG. 10 is directed to a game called flag race. The flag is moved in such a way of using the actual location of the user and the action of picking and dropping the message. For example, the gaming method of the flag race between SNS users is provided as follows. In the flag race, the user enters a predetermined range around the flag to pick the flag and, if the flag is dropped, the flag is place within a predetermined range around the user.

When the game starts, at least one flag is displayed at the start position. Suppose that different flags are displayed at positions 1011 and 1021. In order to pick the flags, the user has to be located within a range defined by a predetermined threshold value of distance from the flag positions 1011 and 1021. If the user is located within the range of the threshold distance from the flag, the user selects a map. Suppose the flag located at the position 1011 is picked by Brice and the flag located at the position 1021 is pricked by Alice on the map. If the user device which has picked the flag moves, the flag moves too.

In the case of Brice, if Brice moves from the position 1011 to pass the positions 1013, 1015, and 1017 in a sequential order, the flag moves along with Brice. Unless Brice drops the picked flag, it moves along with Brice.

In the case of Alice, if Alice moves from the position 1021 to pass the positions 1023, 1024, and 1025 in a sequential order, the flag moves along with Alice. Then if the Alice drops the flag at position 1025, the flag does not move although Alice moves. Unless a user picks the flag at the position 1025, the flag stays at the position 1025. Another user Sandra picks the flag at the position 1025. If Sandra picks the flag, the flag moves along with Sandra. If Sandra moves to the position 1027, the flag moves to that position too. The flag race game of moving flags is performed as described above. This gaming method is applied to an SNS to enrich the user experience through a game among the SNS users.

Figure 11:
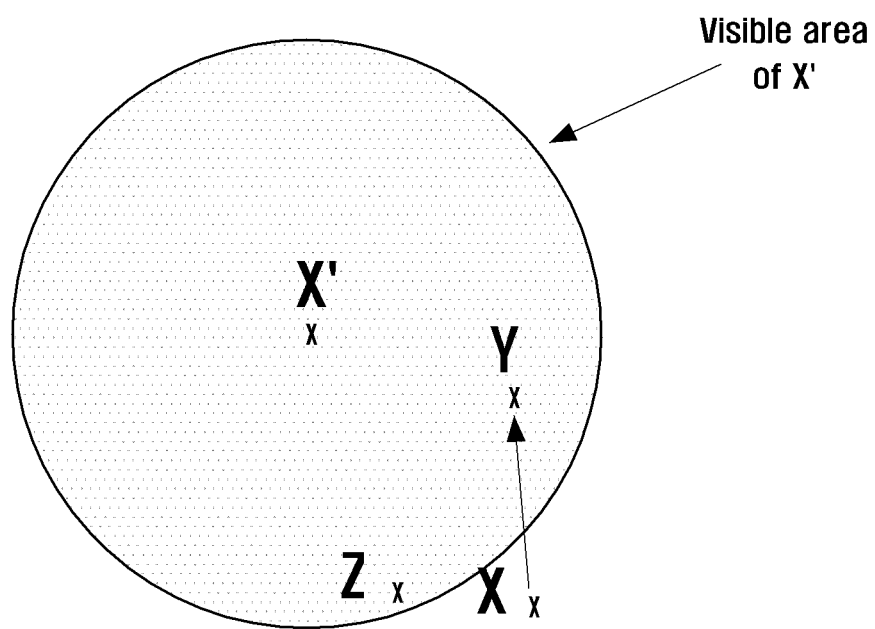
FIG. 11 is a diagram for explaining a parameter for use in an example location-based advertisement method according to this disclosure.
Figure 12:
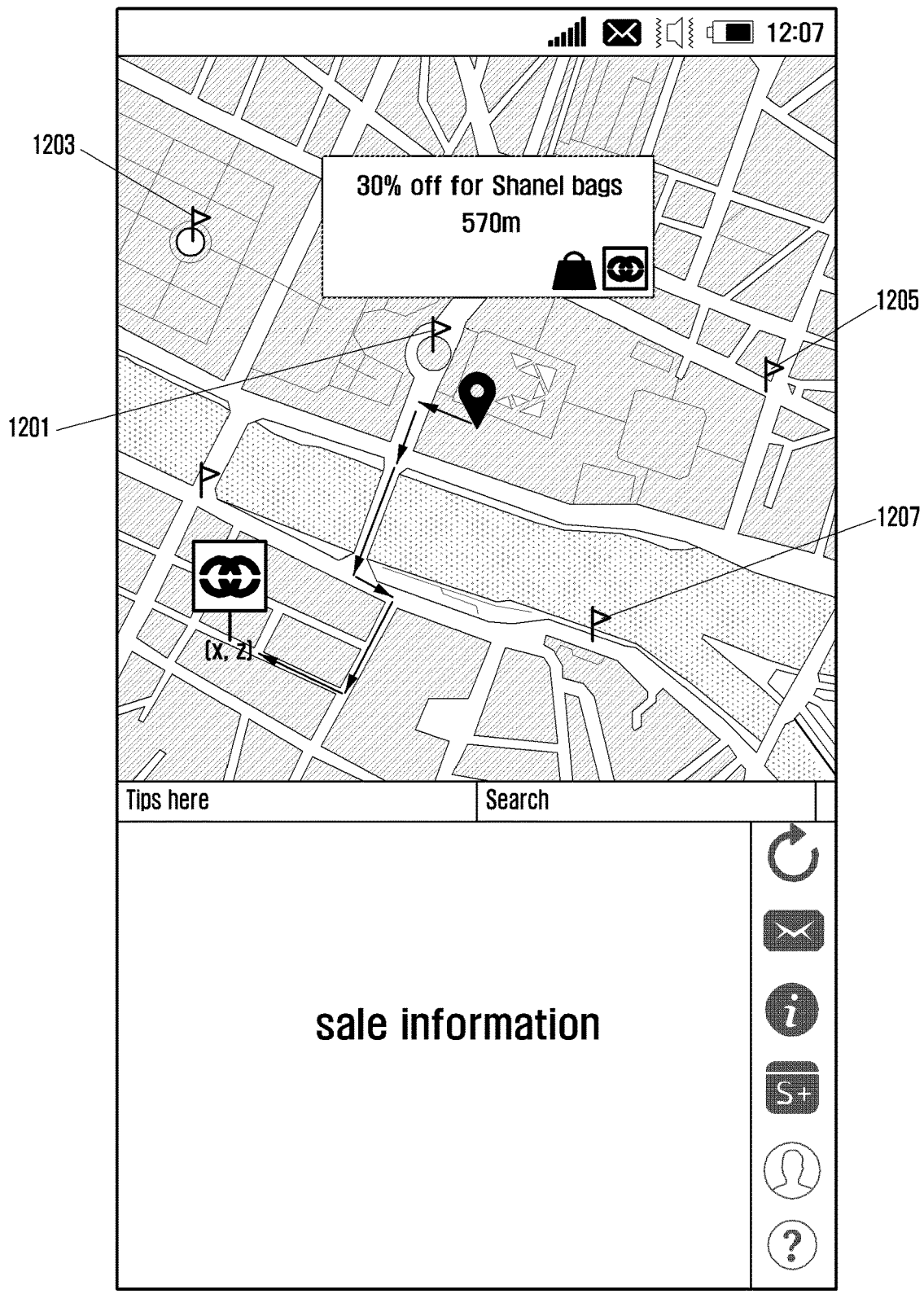
FIG. 12 is a diagram illustrating an example display screen for explaining the location-based advertisement method according to this disclosure.
Figure 13:
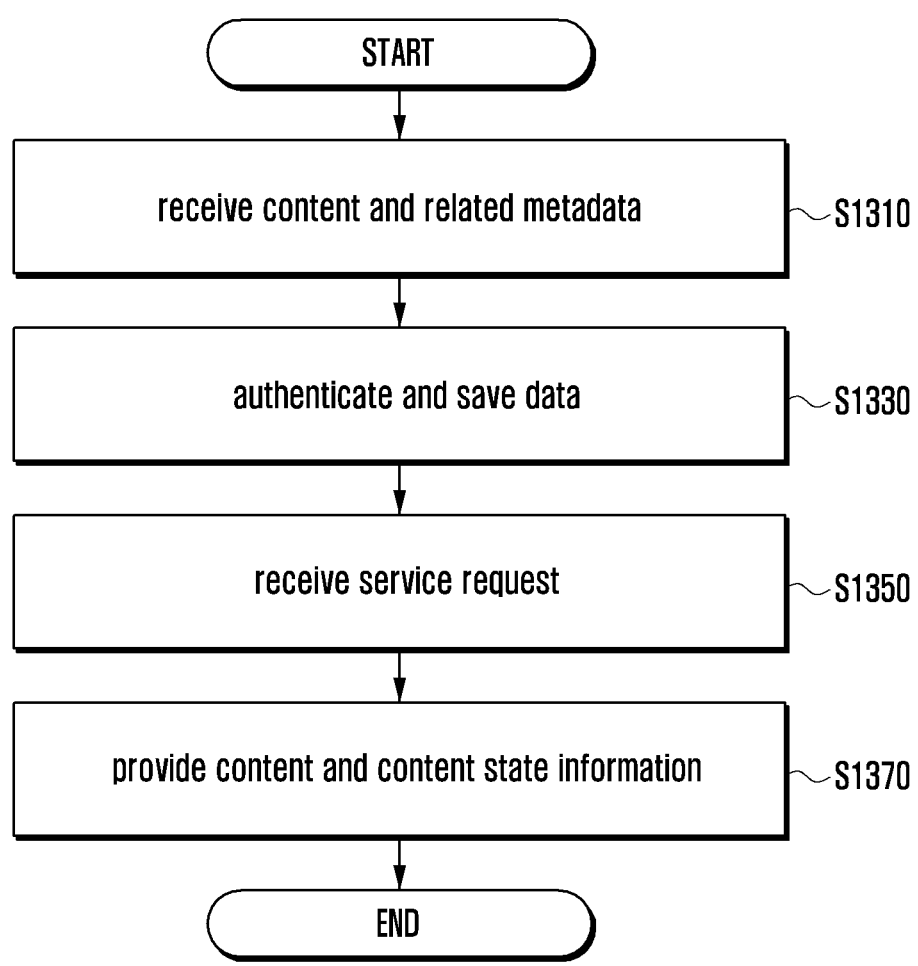
FIG. 13 is a flowchart illustrating an example location-based advertisement method according to this disclosure.

A description is made of an advertisement method according to an embodiment of the present invention with reference to FIGS. 11 to 13. This embodiment is directed to a method of advertisement at a target location. FIG. 11 is a diagram for explaining a parameter for use in the location-based advertisement method according to an embodiment of the present invention, FIG. 12 is a diagram illustrating a display screen for explaining the location-based advertisement method according to an embodiment of the present invention, and FIG. 13 is a flowchart illustrating the location-based advertisement method according to an embodiment of the present invention. The location-based advertisement method is implemented with parameters as shown in FIG. 11. In FIG. 11, X denotes the device location of the user posting an advertisement, Y denotes the posted advertisement display location, X' denotes a location of a normal user, and Z denotes the destination place to be advertised (such as a location of a store). Here, Z and X may not be identical with each other. This is because the advertiser posts the message at the location Z or a location which is different from the location Z.

Referring to FIG. 12, if the user device has an authenticated location in a predetermined area (such as a visual area of application screen) of the corresponding service, the server sends the flag position and information on the service related to the flag. The content provided by the service is determined differently depending on the user profile, records, and device configuration parameters. For example, the service is a shopping advertisement service.

The user posting advertisement creates a message including dependency conditions such as user profile, location, and time. The server sets the following conditions to provide the service users with the message. The following conditions are configured to have priorities to display the advertisement message to the users in a predetermined order.

A distance between advertisement poster and user is d(X, X'). A distance between poster's location and discounter is d(X, Y). A distance between poster's location and user is d(Y, X'). A distance between store location and poster is d(Z, X). A combination of above parameters: such as a distance that equals the sum of d1+d2+d3 or d1*d1+d2*d2+d3*d3, d1=advertiser-user, d2=user-provider, d3=advertiser-provider. A discount target condition (such as person who has posted at least 10 blue messages recently). A user profile where a user may not want to see the discount information including the word "gender". A price paid by discount poster.

A description is made of the situation of discount advertisement at a specific target place with reference to FIG. 12. A specific service is advertised to be provided to a user who picks the flag 1201 and then arrives at the target place Z. In order to pick the flag, the user device has to enter the area defined by a predetermined threshold distance from the flag on the map. The user who has picked the flag and entered the predetermined range around the target place along with the flag is granted the right of receiving the advertised service. If the flag is picked by a user, the information on the route to access the target place Z related to the flag is provided to the user.

As a supplementary advertisement service, it is possible to restrict the number of flags which a user picks during a predetermined time period. It is also possible to configure such that when a flag is picked the service related to the picked flag disappears or the total number of flags to be provided decreases.

The service poster determines to restrict the number of services that is provided and place the flags 1201, 1203, 1205, and 1207 at different locations to attract more reliable customers. The flag poster also designs the service for specific users. In this case, the specific users is determined based on the user profile and metadata. For example, the flag service is designed to be provided to the users fulfilling the profile criteria such as nationality, gender, and age.

FIG. 13 is a flowchart illustrating an example server operation according to this disclosure. Referring to FIG. 13, the server receives contents and metadata of the contents from at least one user device at step S1310. Since the description of the metadata has been made herein, detailed description thereof is omitted.

The server authenticates the metadata received from the user device. The authentication step is omitted. The server stores the contents and the metadata of the contents that are received from the user device at step S1330. The contents and the metadata of the contents are used when the user device requests for the service afterward. The server receives a service request from the user device at step S1350. Various types of services are requested. Examples of the services include the services described above with reference to FIGS. 4 to 12.

The server transmits a response in reply to the service request at step S1370. The response includes content and state information of the content. Since the methods of providing services in response to the service requests have been described with reference to FIGS. 4 to 12, detailed descriptions thereof are omitted herein.

Figure 14:
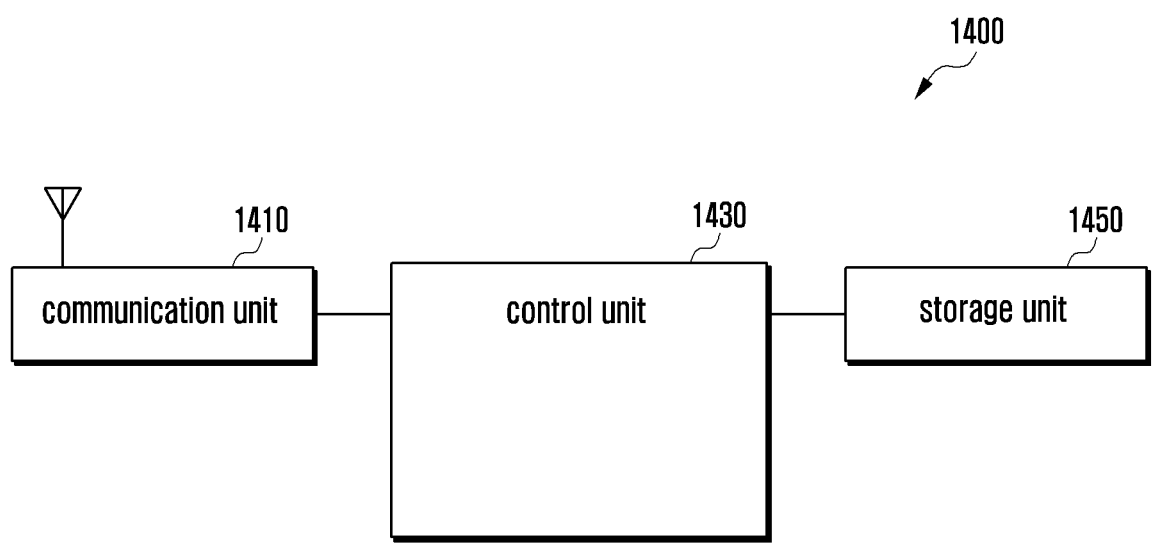
FIG. 14 is a block diagram illustrating an example configuration of a server according to this disclosure.

FIG. 14 is a block diagram illustrating a configuration of an example server according to this disclosure. Referring to FIG. 14, the server 1400 includes a communication unit 1410, a control unit 1430, and a storage unit 1450. The communication unit 1410 communicates with at least one network node. The storage unit 1450 stores the contents received from the user device and metadata of the user device. The control unit 1430 controls overall operation of the server.

According to an embodiment of the present invention, the control unit 1430 control receiving a message including contents and location information of the contents from at least one sending terminal, storing the contents and location informations of the contents, receiving a service request from at least one receiving terminal, and providing the receiving terminal with content state information based on the location information of the contents.

At this time, the content location information includes the first location information based on the location of the sending terminal and the second location information on the location where the contents are posted. The first location information is the terminal location information at the message transmission time point, and the second location information includes the location information of the area where the contents are posted on the map on which the contents are displayed.

The control unit 1430 also controls such that the content state information is determined based on the result of comparison between the distance between the first and second locations and a predetermined threshold. The control unit 1430 also controls such that the validity time of the content is set based on the message reception time, a predetermined default validity time, and popularity of the content.

The service request includes the location information of the receiving terminal. The control unit 1430 also controls such that the movement path is recommended based on the location information of the receiving terminal and statistical movement information of other users. The control unit 1430 also controls receiving a message including contents and location information of the contents from another sending terminal, determining relationship between the sending terminals based on the contents location information of the messages, and recommending the information on the counterpart terminal based on the determination result.

The contents location information of the message further includes the information on the target location. At this time, if the message is selected by the receiving terminal, the control unit 1430 controls to provide the information on the target location. The control unit 1430 also controls to authenticate the selection of the message when the receiving terminal is located in a predetermined distance from the first or second location.

Although the description is made of the function blocks of the server 1400 separately for convenience purpose, the configuration of the server is not limited thereto. Although the description is made of the operations of the respective units of the server, it is obvious that the server performs the operations described above with reference to FIGS. 1 to 13 as well as the operations described with reference to FIG. 14.

Figure 15:
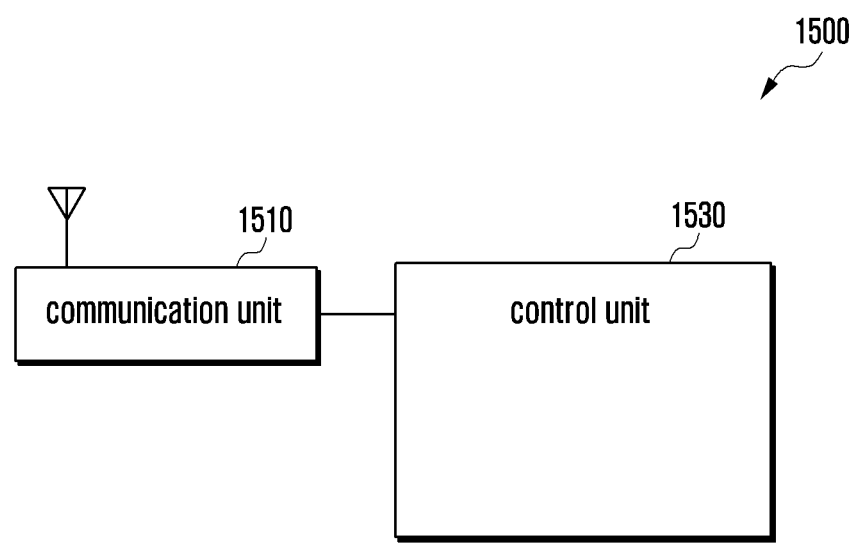
FIG. 15 is a block diagram illustrating an example configuration of a user device according to this disclosure.

FIG. 15 is a block diagram illustrating a configuration of an example user device according to this disclosure. Referring to FIG. 15, the user device 1500 includes a communication unit 1510 and a control unit 1530. The communication unit 1510 is a wireless interface or a wired interface. The communication unit 1510 communicates with at least one network node. The control unit 1530 controls the overall operation of the user device 1500.

According to an embodiment of the present invention, the control unit 1530 control transmitting a message including contents and location information of the contents and receiving the content state information generated based on the contents location information from the server. At this time, the contents location information includes the first location information based on the location of the terminal and the second location information of the location where the contents are posted. The first location information is the location information of the terminal at the message transmission time, and the second location information includes the location information of the area where the contents are posted on the map on which the contents are displayed.

Although the description is made of the function blocks of the user device 1500 separately for convenience purpose, the configuration of the user device is not limited thereto. Although the description is made of the operations of the respective units of the user device, it is obvious that the server performs the operations described above with reference to FIGS. 1 to 13 as well as the operations described with reference to FIG. 15.

As described above, the enhanced location information-based information sharing method and apparatus of the present invention is advantageous in terms of facilitating the information sharing based on the location information. Also, the location information-based information sharing method and apparatus of the present invention is advantageous in terms of facilitating the information sharing by using extended location metadata.

Although various embodiments of the present disclosure have been described using specific terms, the specification and drawings are to be regarded in an illustrative rather than a restrictive sense in order to help understand the present invention. Thus the scope of the invention should be determined by the appended claims and their legal equivalents rather than the specification, and various alterations and modifications within the definition and scope of the claims are included in the claims.

Although the present disclosure has been described with an exemplary embodiment, various changes and modifications are suggested to one skilled in the art. It is intended that the present disclosure encompass such changes and modifications as fall within the scope of the appended claims.

What is claimed is:

1. A method of providing location information-based service by a server, the method comprising:

receiving, from a first terminal, a message including a content, location information for the content, target location information for the content, and display information for the content;

determining a validity time period for the content, the content being deleted from the server as the validity time period expires;

receiving, from a second terminal, a service request for the content within the validity time period, wherein the service request is generated when the message is selected by the second terminal;

approving the service request, based on the second terminal being located within a predetermined distance from a geolocation identified by the location information; and transmitting, to the second terminal, a metadata for the content including the location information, the target location information, and the display information, wherein the location information indicates the geolocation of the first terminal, wherein the display information indicates a position and an area where a display element of the content is to be displayed on the second terminal, wherein the display element satisfying a popularity threshold is displayed on the second terminal, wherein the display element is displayed on the second terminal with a size determined based on a popularity of the content, the size increases as the popularity of the content grows, wherein the validity time period is increased based on the popularity of the content, and wherein a movement path from a first location identified by the location information to a second location identified by the target location information is provided to the second terminal, the movement path being determined from a statistical movement information of users.

2. The method of claim 1, wherein the location information indicates the geolocation of the first terminal at a time when the message is transmitted, and wherein the display information indicates the position or the area where the display element is to be displayed on a map being displayed on the second terminal.

3. The method of claim 1, wherein the metadata is determined based on a result of comparison between a distance between the first location associated with the location information and a third location associated with the display information with a predetermined threshold.

4. The method of claim 1, further comprising:

receiving a message including a content, location information, and display information from a third terminal;

determining a relationship between the first terminal and the third terminal based on the message from the first terminal and the message from the third terminal; and providing information of a counterpart terminal based on a result of the determination.

5. A server for providing location information-based service, the server comprising:

a transceiver configured to transmit and receive a signal; and at least one processor coupled with the transceiver and configured to:

receive, from a first terminal, a message including a content, a location information for the content, target location information for the content, and display information for the content, determine a validity time period for the content, the content being deleted from the server as the validity time period expires, receive, from a second terminal, a service request for the content within the validity time period, wherein the service request is generated when the message is selected by the second terminal, approve the service request, based on the second terminal being located within a predetermined distance from a geolocation identified by the location information, and transmit, to the second terminal, a metadata for the content including the location information, the target location information, and the display information, wherein the location information indicates the geolocation of the first terminal, wherein the display information indicates a position and an area where a display element of the content is to be displayed on the second terminal, wherein the display element satisfying a popularity threshold is displayed on the second terminal, wherein the display element is displayed on the second terminal with a size determined based on a popularity of the content, the size increases as the popularity of the content grows, wherein the validity time period is increased based on the popularity of the content, and wherein a movement path from a first location identified by the location information to a second location identified by the target location information is provided to the second terminal, the movement path being determined from a statistical movement information of users.

6. The server of claim 5, wherein the location information indicates the geolocation of the first terminal at a time when the message is transmitted, and wherein the display information indicates the position or the area where the display element is to be displayed on a map being displayed on the second terminal.

7. The server of claim 5, wherein the at least one processor is configured to determine the metadata based on a result of a comparison between a distance between the first location associated with the location information and a third location associated with the display information with a predetermined threshold.

8. The server of claim 5, wherein the at least one processor is further configured to:

receive a message including a content, location information and display information from a third terminal, determine a relationship between the first terminal and the third terminal based on the message from the first terminal and the message from the third terminal, and provide information of a counterpart terminal based on a result of the determination.

9. A method of receiving location information-based service by a first terminal, the method comprising:

transmitting, to a server, a service request for a content;

receiving, from the server, a metadata for the content including location information for the content, target location information for the content, and display information for the content; and displaying a display element of the content based on the location information and the display information, wherein a message is transmitted from a second terminal to the server prior to the service request, the message including the content, the location information, the target location information, and the display information, wherein the service request is generated by selecting the message, wherein the metadata is received when the service request is approved by the server, based on the first terminal being located within a predetermined distance from a geolocation identified by the location information, wherein a validity time period for the content is determined by the server, the content being deleted from the server as the validity time period expires, wherein the location information indicates the geolocation of the second terminal, wherein the display information indicates a position and an area where the display element of the content is to be displayed on the first terminal, wherein the display element satisfying a popularity threshold is displayed on the first terminal, wherein the display element is displayed on the first terminal with a size determined based on a popularity of the content, the size increases as the popularity of the content grows, wherein the validity time period is increased based on the popularity of the content, and wherein a movement path from a first location identified by the location information to a second location identified by the target location information is provided to the first terminal, the movement path being determined from a statistical movement information of users.

10. The method of claim 9, wherein the location information indicates the geolocation of the second terminal at a time when the message is transmitted, and wherein the display information indicates the position or the area where the display element is to be displayed on a map being displayed on the first terminal.

11. A first terminal for receiving location information-based service, the first terminal comprising:
a transceiver configured to transmit and receive a signal; and
at least one processor coupled with the transceiver and configured to:
transmit, to a server, a service request for a content,
receive, from the server, a metadata for the content including location information for the content, target location information for the content, and display information for the content, and
display a display element of the content based on the location information and the display information, wherein a message is transmitted from a second terminal to the server prior to the service request, the message including the content, the location information, the target location information, and the display information, wherein the service request is generated by selecting the message, wherein the metadata is received when the service request is approved by the server, based on the first terminal being located within a predetermined distance from a geolocation identified by the location information, wherein a validity time period for the content is determined by the server, the content being deleted from the server as the validity time period expires, wherein the location information indicates the geolocation of the second terminal, wherein the display information indicates a position and an area where the display element of the content is to be displayed on the first terminal, wherein the display element satisfying a popularity threshold is displayed on the first terminal, wherein the display element is displayed on the first terminal with a size determined based on a popularity of the content, the size increases as the popularity of the content grows, wherein the validity time period is increased based on the popularity of the content, and wherein a movement path from a first location identified by the location information to a second location identified by the target location information is provided to the first terminal, the movement path being determined from a statistical movement information of users.

12. The first terminal of claim 11, wherein the location information indicates the geolocation of the second terminal at a time when the message is transmitted, and wherein the display information indicates the position or the area where the display element is to be displayed on a map being displayed on the first terminal.

* * * * *